US008671200B2

(12) United States Patent
Siemens

(10) Patent No.: US 8,671,200 B2
(45) Date of Patent: Mar. 11, 2014

(54) METHOD FOR TRANSPORTING DATA OVER A DATA CONNECTION AND NETWORK COMPONENT

(75) Inventor: Eduard Siemens, Sehnde (DE)

(73) Assignee: Tixel GmbH, Hannover (DE)

(*) Notice: Subject to any disclaimer, the term of this patent is extended or adjusted under 35 U.S.C. 154(b) by 289 days.

(21) Appl. No.: 12/936,263

(22) PCT Filed: Mar. 26, 2009

(86) PCT No.: PCT/EP2009/053630
§ 371 (c)(1),
(2), (4) Date: Oct. 4, 2010

(87) PCT Pub. No.: WO2009/121802
PCT Pub. Date: Oct. 8, 2009

(65) Prior Publication Data
US 2011/0029632 A1     Feb. 3, 2011

(30) Foreign Application Priority Data

Apr. 4, 2008 (EP) .................................. 08154106

(51) Int. Cl.
*G06F 15/16* (2006.01)
(52) U.S. Cl.
USPC ........................................................ 709/227
(58) Field of Classification Search
USPC ................................................. 709/330, 227
See application file for complete search history.

(56) References Cited

U.S. PATENT DOCUMENTS

| 4,803,685 A | 2/1989 | Oget |
| 7,483,943 B2 * | 1/2009 | Kakivaya et al. ............. 709/203 |
| 7,929,415 B2 * | 4/2011 | Kwak et al. ................... 370/208 |
| 2009/0216901 A1 * | 8/2009 | Schloming .................... 709/237 |

FOREIGN PATENT DOCUMENTS

| WO | 2008039025 A | 4/2008 |
| WO | WO 2008039025 * | 4/2008 |
| WO | WO 2009/087030 | 7/2009 |

OTHER PUBLICATIONS

International Search Report dated Jun. 4, 2009 for related PCT application PCT/EP2009/053630.

(Continued)

*Primary Examiner* — Alicia Baturay
(74) *Attorney, Agent, or Firm* — Howard IP Law Group, PC

(57) ABSTRACT

The invention relates to a method for transporting data over a data connection between a sending network component and a receiving network component via a network. The method solves a problem with the reliable data transport protocol according to which a number of data transport packets will be acknowledged in regular time intervals. When such an acknowledge message is lost, the sending network component will have to keep the data for the purpose of retransmission and cannot free its sending buffer. The invention proposes to repeat such an acknowledge message as a precaution for the case that it gets lost after a short time. The time for repeating is set to be less than an RTT (round trip time for the connection). The solution disregards the fact that no statement about the reception of the acknowledge message can get back to the receiver before the RTT has elapsed. For wide area connections in high bandwidth networks, where high RTT values exist, this has the advantage that significant delays in carrying on sending data or unnecessary retransmissions of significant amount of data can be avoided.

8 Claims, 5 Drawing Sheets

(56) References Cited

OTHER PUBLICATIONS

Figure 1:
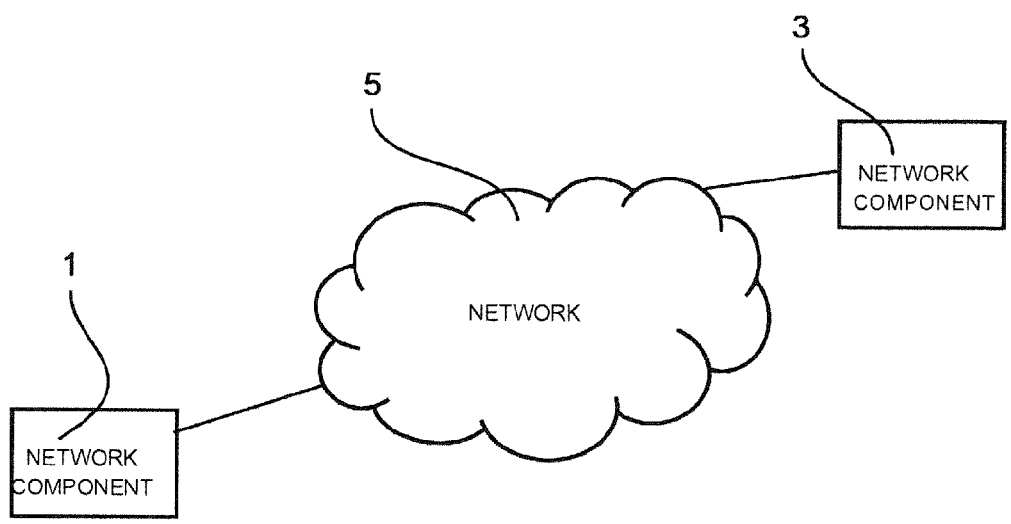

Transmission Control Protocol Darpa Internet Program Protocol Specification Sep. 1981; Defense Advanced Research Projects Agency Information Processing Techniques Office; Information Sciences Institute; University of Southern California.

Cosimo Anglano, Massimo Canonico; Performance Analysis of High-performance File Transfer Systems for Grid Applications; Concurrency and Computation:Practice & Experience, vol. 18, pp. 807-816; 2006.

Yunhong Gu; Thesis—UDT: A High Performance Data Transport Protocol; University of Illinois at Chicago, 2005.

* cited by examiner

METHOD FOR TRANSPORTING DATA OVER A DATA CONNECTION AND NETWORK COMPONENT

CLAIM FOR PRIORITY

This application is the national stage application under 35 U.S.C. §371 of the International Application No. PCT/EP2009/053630, filed Mar. 26, 2009, and claims the benefit of European Application No. EP 08154106.2, filed Apr. 4, 2008, the entire disclosures of which are incorporated herein by reference in their entireties.

The invention relates to a method for transporting data over a data connection between a sending network component (1) and a receiving network component (3) via a network (5), and an adapted network component (3).

BACKGROUND OF THE INVENTION

An important issue in networks connecting network components through data connections or data links relates to the optimized use of the data connections. Ideally, the utilized network protocol will provide for adjustment of transmission parameters for transmitting messages via the data connections in such a way, that the available bandwidth of the data connections are used fully, while avoiding a loss of data. This aim may be achieved by appropriate congestion control in order to estimate or calculate an optimal transmission parameter such as an optimal transmission rate with which data of a message are transmitted. If the transmission rate is too low, the bandwidth of the physical connection is not utilized fully. On the other hand, a transmission rate adjusted too high might lead to overflow of transmission buffers and eventually to data loss.

Transport protocol implementations for reliable data transmission based on an IP (Internet Protocol) stack provide for data packet acknowledgement in order to recognize data losses. In a reliable data transport protocol the lost packets will be retransmitted. The protocol implementations mostly handle acknowledge messages using byte sequencing or packet sequencing for data identification. After the elapse of a certain time period the transmitting device interprets the absence of such an acknowledge message for a certain time period as a packet loss. The respective data will then be retransmitted by the transmitter device. The waiting time period before retransmission is set to be at least the Round Trip Time (RTT) between transmitting and receiving end plus some margin since no data acknowledge can occur in less than RTT since the sending time point.

The invention starts with the recognition that not only data packets can get lost in IP networks but also acknowledge messages. In a reliable transport protocol like TCP (Transmission Control Protocol) the missing of an acknowledge message is interpreted by the data sender as a data packet loss, leading to a retransmission of the respective data, although they are already received by the receiver.

In more recent transport protocol proposals like UDT (UDP-based Data Transfer Protocol, where UDP stands for User Datagram Protocol) it is suggested to send also acknowledge packets to acknowledge messages—so called ACK-ACKs in order to avoid these unnecessary double data transmissions. It is state-of-the art in this case at the data receiver side (this is the ACK-emitter) to wait also at least an RTT before issuing a retransmission of an acknowledge message.

It is important to know that the number of data packets that are acknowledged in one ACK message is subject to the protocol implementation or it is programmable. In the field of professional high speed networking, e.g. based on 10 GBit Ethernet technology an implementation can be that acknowledge messages are issued every 10 ms. This means that all the data packets received in that time period will be checked in regard to one or more characteristic like the correct sequence numbering. If there is no violation of the sequence numbering, the ACK message will be generated. The ACK message reports the correct reception of all the data packets received in the interval from the previous ACK message on. If there is a violation, it means that all the data packets received in that period are not acknowledged and thus the sender needs to repeat them.

If the ACKACK message is missing, the receiver will generate an ACKACK message a second time after elapse of at least the RTT. Clearly it has the disadvantage that the sender can not free the corresponding part of the protocol buffer before ACK has been received.

THE INVENTION

The object of the invention is to provide a method and a network component in order to improve the transmission properties of a data transmission via a network.

This object is achieved by a method for transporting data over a data connection between a sending network component.

According to one aspect of the invention, the method comprises the following steps of sending a number of data transport messages to the receiving network component by the sending network component; receiving the number of data transport messages by the receiving network component; sending an acknowledge message back to the sending network component by the receiving network component indicating correct reception of the number of data transport messages; wherein the method is characterized by the further step of repeating an acknowledge message by the receiving network component after a time less than a round trip time for the communication between the sending network component and the receiving network component.

This has a substantial advantage in the following case. Considered is the situation that at least one acknowledge message is lost and the receiver has not received further data for acknowledgement within an acknowledged timeout period of at least one RTT. Since the receiver will retransmit the acknowledge message in a time less than one RTT, the sender receives a retransmitted ACK earlier than in the state of the art implementation and so starts delivering further data packets earlier. The same effect could be observed, when the sender emits data within bursts instead of a constant data rate. The solution according to an embodiment of the invention provides for a faster recognition that only the acknowledge message has gotten lost and thereby avoids retransmission of the data. The sender does not need to retransmit the data and it is possible to free the corresponding part of the sending buffer much earlier. In consequence the sender can carry on transmitting further data considerably faster. The overall performance of the data transport is increased.

Another preferred embodiment of the invention comprises the step of periodically repeating the acknowledge message with a time period being less than the round trip time until an acknowledge message is received back from the sending network component for indicating that the acknowledge message from the receiving network component has been correctly received. This embodiment provides even better reliability for the acknowledgement of data segments.

An advantageous embodiment of the invention comprises the step of coupling the time period for repeating the acknowledge message from the receiving network component (3) to the selected acknowledge message sending interval which is less than the round trip time. It simplifies the algorithm for retransmission of lost data packets.

Corresponding advantageous embodiments for a network component adapted for the use in the method according to the invention, particularly for a receiving network component are apparent from the appended claims.

DRAWINGS

Figure 2:
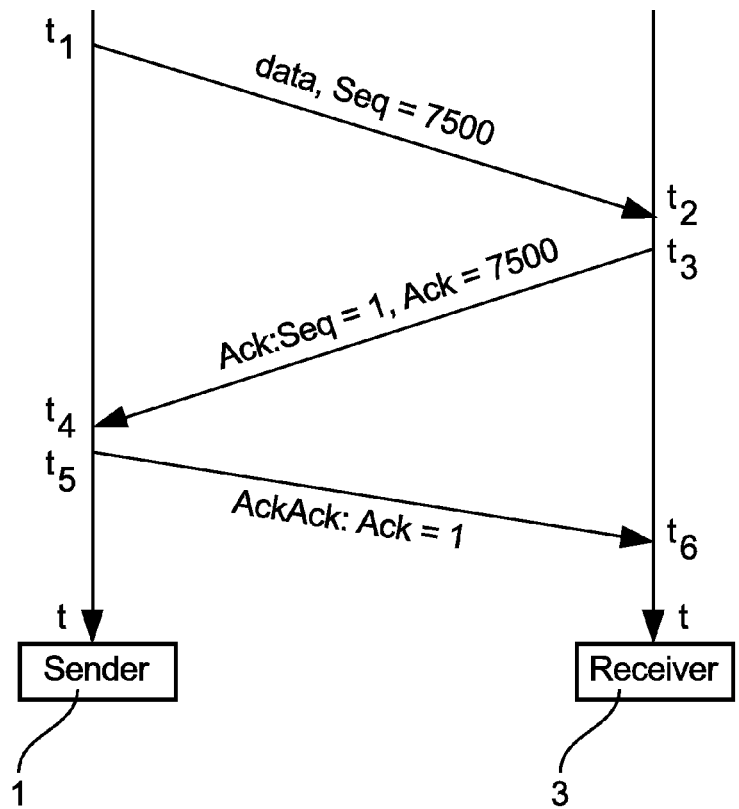
Figure 6:
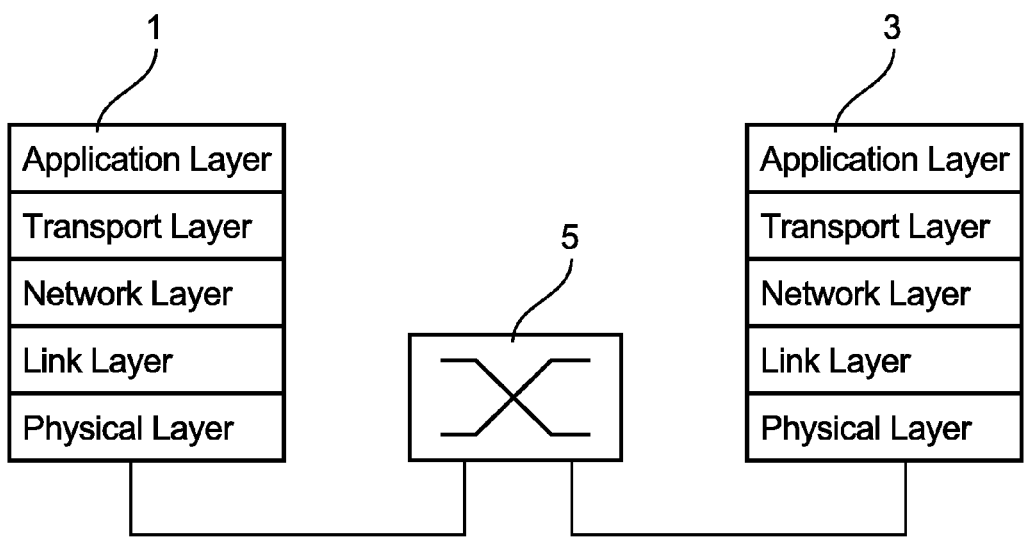
Figure 3:
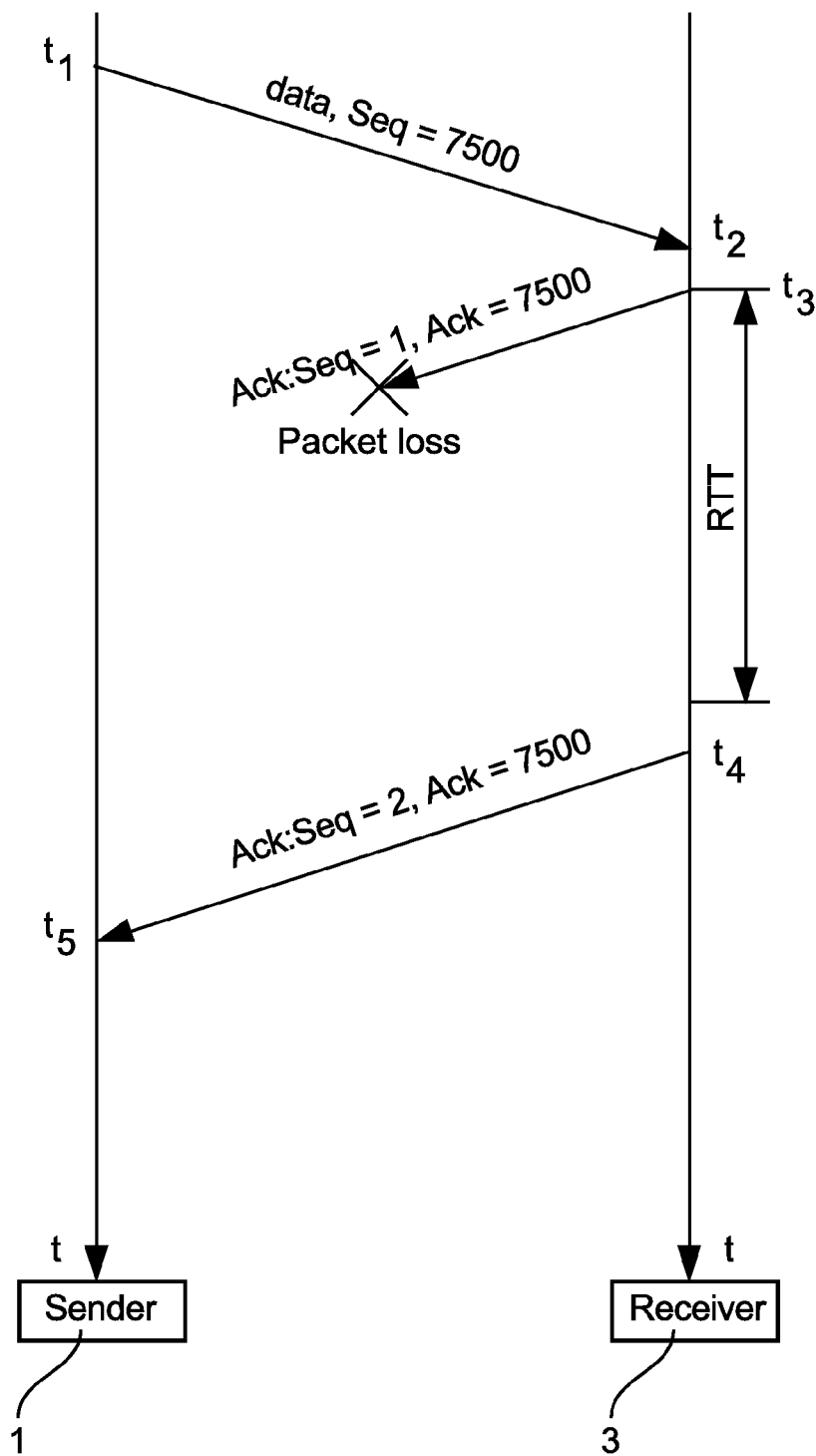
Figure 4:
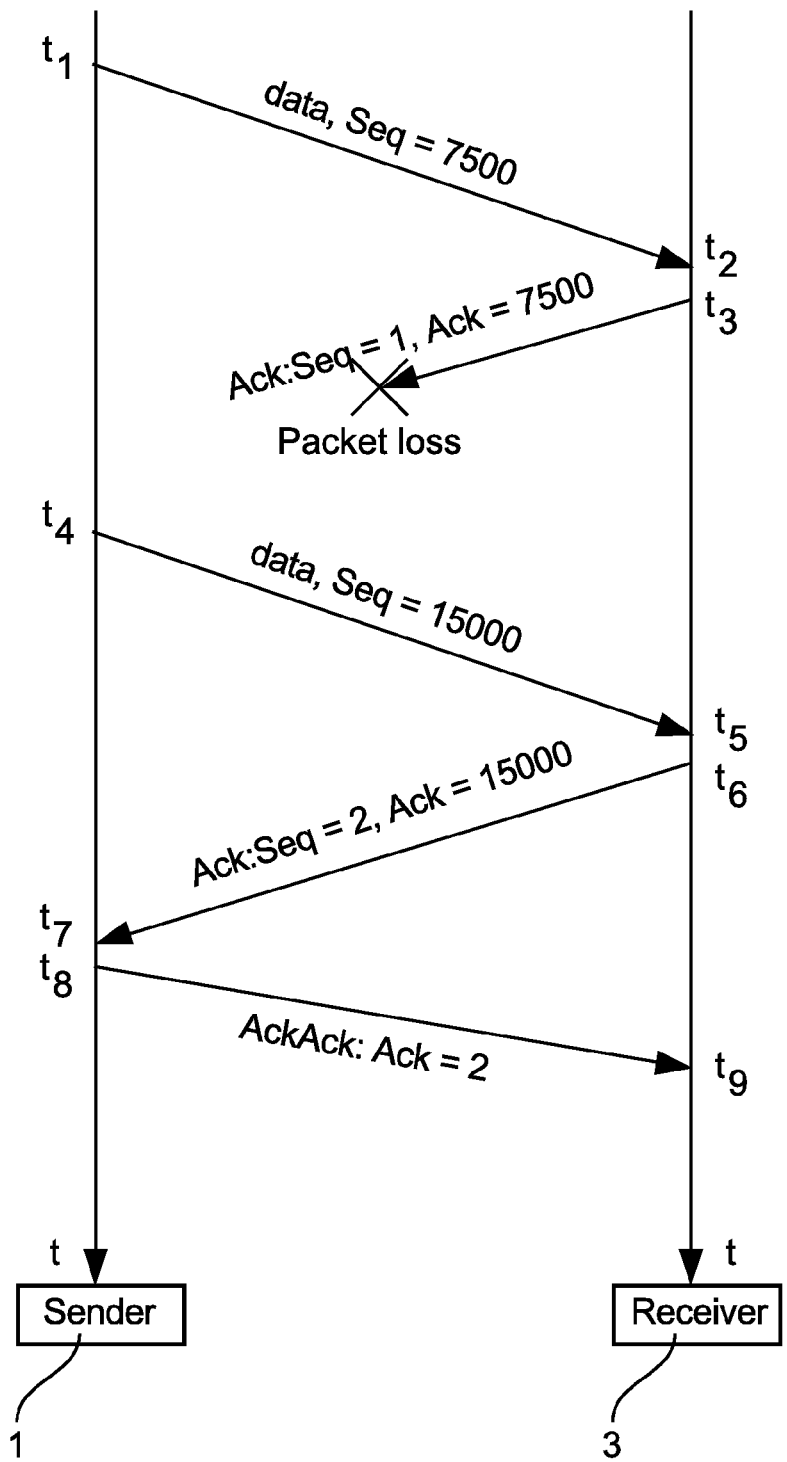
Figure 5:
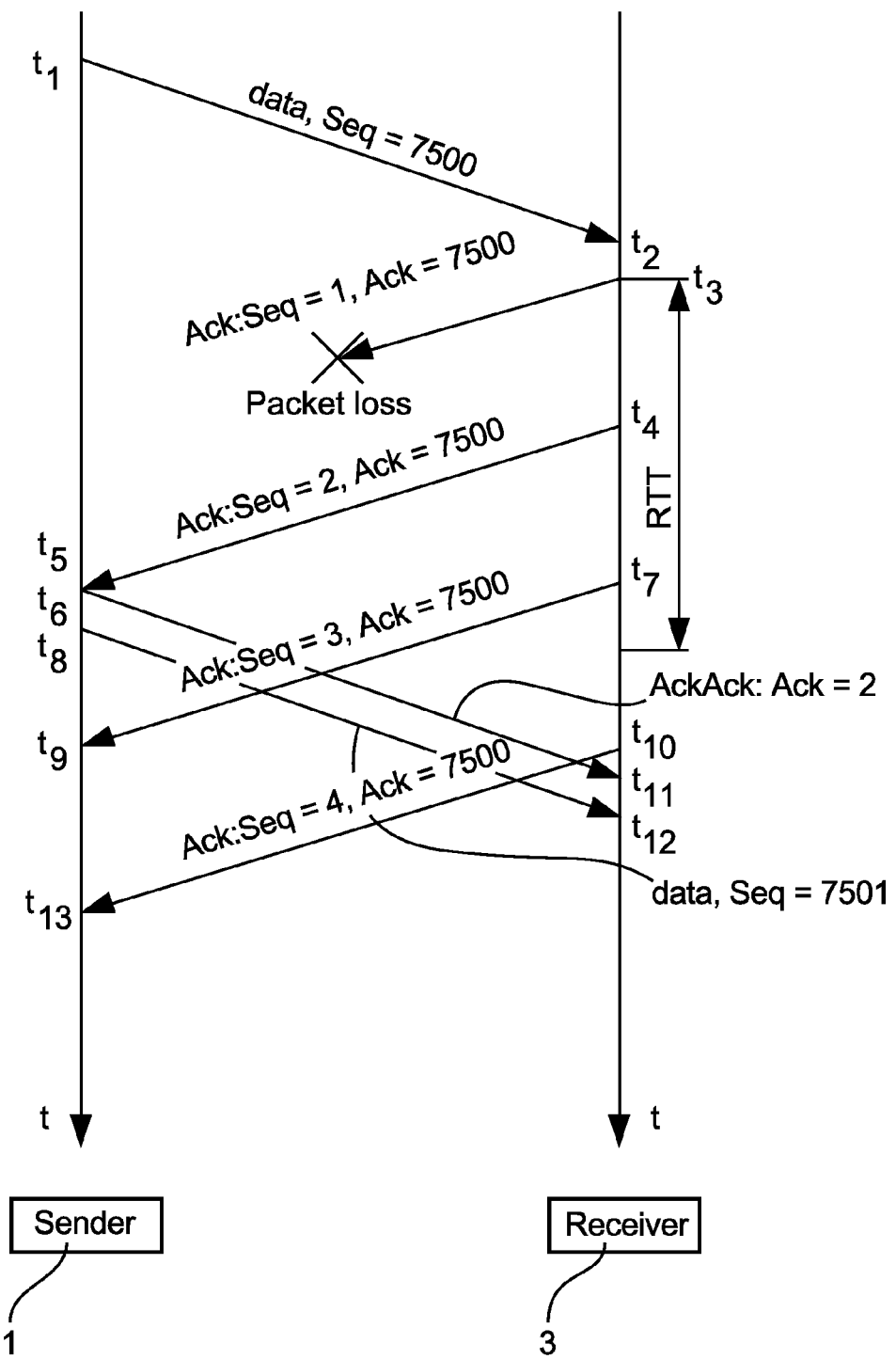

Embodiments of the invention are depicted in the drawings and will be explained hereinafter. The drawings show in:

FIG. 1 an arrangement of a sending component and a receiving component connected via a network;

FIG. 2 the general three-way data and acknowledge model;

FIG. 3 a communication in which an ACK message for a first data sequence is lost but implicitly acknowledged after transferral of a second data sequence;

FIG. 4 a communication in which an ACK message is retransmitted after a regular timeout event;

FIG. 5 a communication in which an ACK message for a first data sequence is lost but repeated in short succession according to the invention, and;

FIG. 6 an illustration of the involvement of the different network protocol layers for the transfer of data packets.

DETAILED DESCRIPTION OF EMBODIMENTS
ACCORDING THE INVENTION

The Internet Protocol (IP) is a widely utilized network protocol for data transport. IP delivers an unreliable connection service to upper layer protocols and to applications. However, many applications, such as file transfer based applications and many peer-to-peer applications, require reliable and lossless connection oriented network services. The adoption of unreliable IP services to stream-oriented lossless reliable services is a major task of the transport layer (layer four) of the Open Systems Interconnection Basic Reference Model or OSI Model. A well known transport protocol that delivers reliable connections over IP is the Transport Control Protocol (TCP), described in the publication ISI USC, *Transport Control Protocol*, Request for Comments. IETF, September 1981.

However, due to limitations of TCP on high throughput long distance connections (so called Long Fat Pipes), many new approaches of alternative transport protocols have been revealed in the recent past, as described by C. Anglano and M. Canonico in their publication *Performance analysis of high-performance file-transfer systems for Grid applications*, Concurrency and Computation: Practice & Experience, volume 18, pages 807-816 (2006).

Another protocol called UDT is described in a thesis from the University of Illinois at Chicago made by Yunhong Gu with the title, "UDT: A High Performance Data Transport Protocol" in 2005. These approaches and transport protocols derive their transmission data rate from the round-trip time (RTT) or from the one-way delay (OWD). Herein the OWD denotes the time it takes for a message, for example in form of a data packet, to travel from an origin or sending network component to a destination or receiving network component, while the RTT is the time period starting when the sending network component sends out a message and ending when a reply to the sent message like an ACK message, transmitted by the receiving network component is received by the sending network component. Further details on how to advantageously derive RTT or OWD values are disclosed in the parallel European Patent Application EP 08 101 897.0 of the applicant. The UDT protocol makes use of the so-called ACKACK messages with which the sender acknowledges the reception of the acknowledge message from the data receiver.

Shown in FIG. 1 are a sending component 1 and a further network component 3, which are connected to a network 5 with wired or wireless connections. Via the network 5, the two network components 1 and 3 may communicate by first establishing a data connection. Depending on the complexity of the network 5, such a data connection may lead over one or several other components (not shown in FIG. 1) inside the network 5, including switches and routers, which direct messages from the sending network component 1 to the receiving network component 3 and vice versa.

When establishing a data connection between the two network components 1 and 3, the first message transmitted by the sending network component 1 and received by the receiving network component 3 is defined herein as the initiating message, because it initiates the data connection.

Congestion control includes a number of different implementations that may differ in which transmission parameters are adjusted and/or in how these parameters are estimated. For message transmission protocols such as the transmission control protocol (TCP) and variations thereof, an algorithm called "slow start" is widely used.

According to the slow start algorithm, a congestion window, corresponding to a buffer size at the sending network component 1 for the message to be transmitted, is set to an initial value depending on the TCP variation employed, such as TCP Reno, TCP Newreno, TCP Tahoe etc. After sending the initiating message to the receiving network component 3, the sending network component 1 will wait for an acknowledgement by the receiving network component 3. After receiving the initiating message acknowledgement, the sending network component 1 will transmit further messages and receive their respective message acknowledgements.

FIG. 2 illustrates the general three-way data and acknowledge model. A sequence of data packets is transmitted by the sender 1 to receiver 3 over the network 5 at time $t_1$. The sequence includes data packets with sequence numbers 1 to 7500. For clarification, only the transferal of the data packet with sequence number 7500 is illustrated in FIG. 2. At time point $t_3$ receiver 3 sends an ACK message back to the sender 1. This message may contain the quantified information which data packets with which range of sequence numbers have been correctly received. In the illustration it is indicated that the acknowledged sequence number range is up to the packet with sequence number 7500. So, all the packets with sequence numbers 1 to 7500 are acknowledged. In one transport protocol implementation for the 10 GBit Ethernet network technology an ACK message is periodically sent based on a 10 ms time period. This corresponds typically to the transfer of a few thousand transport packets. The amount of data sent in the 10 ms interval corresponds to ~12 Mbytes in total. Due to the fact that also such an ACK message can get lost, the receiver generates a ACKACK message in response to the reception of the ACK message at time $t_5$.

The corresponding part of the protocol buffer for sending data allocated in the sender 1 will be freed after the reception of the ACK message at time $t_4$. The receiver 3 may indicate to the application in the device 3 that a new data segment is available for processing from the time $t_3$ on. It will however keep track of the response to the ACK message. When the ACKACK message is received at time $t_6$, the data transfer is completed. If the ACKACK message is missing, the receiver 3 repeats the ACK message after a while so that the sender shall get a further chance to free its buffer.

This is illustrated in FIG. 3. Here, the timeout value is set to be equivalent to one RTT. As explained above, RTT is the round trip time for sending a message to a station and receiving back an immediate answer. Therefore, simply the answer is not expected earlier than that. In case the first ACK message gets lost on the data path as illustrated, the sender 1 cannot free the buffer until time point $t_5$ when the repeated ACK message is received. For the purpose of monitoring and managing the different ACK messages, they also come with sequence numbers. It is special in FIG. 3, that the sender stops sending further packets until the ACK message for packet 7500 is received. This will happen when e.g. the application in the sender does not deliver further data, or the buffer is completely filled with unacknowledged data which need to be kept for retransmission.

FIG. 4 illustrates a different situation. When the ACK message sent out at time $t_3$ gets lost, the sender continues sending data packets. When the data packet with sequence number 15000 is sent at time $t_4$, which later is acknowledged at time $t_6$, the sender interprets this at time $t_7$ as an implicit acknowledgement of the data packets sent in the previous acknowledgement interval up to the packet with sequence number 7500. This is compliant to the acknowledgement system according to the TCP protocol.

FIG. 5 shows the same situation as in FIG. 3. The sender 1 again waits for the ACK message in order to be able to free its buffer. In the embodiment according to the invention the receiver 3 repeats the ACK message in shorter succession than in the embodiment of FIG. 3 as a precaution. It means that the receiver does not wait for one RTT at minimum before repeating the ACK message. The solution is taken due to the recognition of the inventor that lost acknowledge messages in a situation as considered here, can subjectively slow down the data transport process. It is illustrated that the first repetition of the ACK message is already correctly received at time $t_5$. The sender can free its buffer at this time. This is substantially earlier than time $t_5$ in FIG. 3. Further repetitions of the ACK message follow at times $t_7$ and $t_{10}$. The repetition is stopped when the ACKACK message for the first repeated ACK message is received at time $t_{11}$ at the receiver 3. After the sender 1 has cleared its buffer, and new data has been received from the application, the sender 1 continues sending data packets at time $t_8$. Again, this is significantly earlier than in the embodiment of FIG. 3. In an advantageous embodiment of the invention the interval for repeating the ACK messages can be defined by the value RTT/n, where n is a real or natural number higher than 1.

In another embodiment of the invention the interval for repeating the ACK messages is coupled to the regular ACK message sending period. The following outline explains when this should be taken:

In cases of sustained data transmission with a high data rate and in absence of acknowledge losses or with a reasonable low loss rate of acknowledge messages, data packets can be acknowledged periodically with a period duration much less than a RTT. A common acknowledge period is e.g. 10 milliseconds, while on a transcontinental network connection; RTT can have an amount of 100 ms and even higher. If an acknowledge message is lost, but the sender continues sending data packets, see FIG. 4, the sender 1 would receive after 10 ms waiting time the next ACK message, which implicitly acknowledges all data.

However, in case that a couple of consecutive acknowledges are lost, the sender 1 can mark all data emitted since the last received acknowledge as lost and try to retransmit them again. On a link with a RTT of 100 ms and a data rate of 8 Gbit/s, at least 100 Mbytes would be retransmitted unnecessarily if just the ACK messages are lost. The same effect could be observed, when the sender 1 emits data within bursts instead of a constant data rate.

It is therefore proposed to retransmit acknowledge messages earlier than after a RTT at least under the following condition:

a) no new acknowledges have to be sent after a time period according to the applied protocol algorithm.

Preferably in case that condition a) is true, it is proposed to retransmit ACK messages after a period RTT/n, with n greater than 1, see above.

Another possibility if condition a) is true, is to retransmit acknowledges after a time period k whereby k is coupled to the ack sending period, so that the relation $k*T_{ACK}<RTT$ is met. $T_{ACK}$ is the ACK sending period, e.g. 10 ms.

It is to be noted that also the ACKACK messages can get lost. The conception of an earlier repetition of an ACKACK message than after RTT can likewise be used and bring the advantage of reduced overhead in the sender 1 and receiver 3, for handling ACKACK messages.

FIG. 6 shows the involvement of the different network layers in the data transport between transmitter 1 and receiver 3. The depicted layers correspond to the layers defined in the ISO/OSI reference model for data communication. Physical layer 10 and link layer 20 might be in an 10 GBit Ethernet or Infiniband interface, implemented in hardware. The other layers, network layer 30, transport layer 40 and application layer 50 are preferably implemented with software means. Reference number 5 denotes the network components with e.g. switchers and routers. The buffer used for sending the data in sender 1 is allocated in the main memory but administered in the transport layer 4. A corresponding receiving buffer exists in the receiver 3.

The features of the invention as disclosed in the above description, in the claims and in the drawing may be of importance for the implementation of the various embodiments of the invention both individually and in any desired combination. The building blocks according the invention like the sending means and timing means, etc. can be implemented with hardware and/or software means.

The invention claimed is:

1. A method for transporting data over a data connection between a sending network component and a receiving network component via a network, wherein the data connection leads over one or more other components, including at least one or more switches and routers, the method comprising:

sending a number of data packets to the receiving network component by the sending network component;

receiving the number of data packets by the receiving network component;

sending an acknowledge message back to the sending network component by the receiving network component indicating correct reception of the number of data packets;

sending an ACKACK acknowledge message back to the receiving network component by the sending network component indicating correct reception of the acknowledge message; and periodically repeating the acknowledge message by the receiving network component after a time period shorter than a round trip time for the communication between the sending network component and the receiving network component until it receives an acknowledge message that is sent by the sending network component and that acknowledges correct reception of the acknowledge message sent by the receiving network component, wherein the round trip time is the expected time period that lies between sending out a message by the sending network component and receiving at the sending network component an immediate reply to the sent message from the receiving network component, and wherein the time period for repeating the acknowledge message from the receiving network component corresponds to a value RTT/n, where RTT is the estimated round trip time and n is a real or natural number greater than 1.

2. The method according to claim 1, wherein the time period for repeating the acknowledge message from the receiving network component is coupled to the selected acknowledge message sending interval which is less than the round trip time.

3. The method according to claim 1, further comprising commencing sending further data transport messages after receiving the acknowledge message from the receiving network component by the sending network component.

4. The method according to claim 3, wherein the data transport message and the further data transport message, comprise one or more data packets.

5. The method according to claim 4, wherein the data packets conform to the transmission control protocol (TCP) or the transmission control protocol in connection with the internet protocol (TCP/IP).

6. A receiving network component comprising:
receiving means configured to receive a data packet from a sending network component;
sending means configured to send a separate acknowledge message to the sending network component in response to the reception of the data packet; wherein
the sending means being configured to periodically repeat the separate acknowledge message until receipt of an acknowledge message that is sent by the sending network component and that acknowledges correct reception of the acknowledge message sent by the receiving network component, wherein the sending means include timing means that are configured to adjust the time for sending out the repeated acknowledge message to a time period shorter than a round trip time for the communication between the sending network component and the receiving network component, wherein the round trip time is the expected time period that lies between sending out a message and receiving an immediate reply to the sent message, and wherein the time period for repeating the acknowledge message from the receiving network component corresponds to a value RTT/n, where RTT is the estimated round trip time and n is a real or natural number greater than 1.

7. The receiving network component according to claim 6, wherein, the timing means determine the time interval for repeating the acknowledge message to be in synchronization with the time interval for generating acknowledge messages during reception of a data stream.

8. A method for transmitting data in a network from a sending network component to a receiving network component comprising the steps of:
receiving at the receiving network component, at least one data packet sent by the sending network component;
transmitting, from the receiving network component to the sending network component, a first acknowledgment message confirming receipt of the at least one data packet; and
after said transmitting said first acknowledgement message, periodically repeating transmission of said acknowledgement message until the receiving network component receives an acknowledgement message that is sent by the sending network component and that acknowledges correct reception of the acknowledgement message sent by the receiving network component;
wherein the time interval between the transmission of consecutive ones of said acknowledgement messages is shorter than an estimated round trip time between sending out a message by the sending network component and receiving at the sending network component a reply to the sent message from the receiving network component, and wherein the time period for repeating the acknowledgement message from the receiving network component corresponds to a value RTT/n wherein RTT is the estimated round trip time and n is a real or natural number greater than 1.

* * * * *